Nov. 26, 1963   P. R. WATT   3,111,708
CAPSULE MANUFACTURE
Filed Jan. 4, 1961   3 Sheets-Sheet 1

INVENTOR
Peter Ridgway Watt
BY
Albert F. Jacobs
ATTORNEY

Nov. 26, 1963 P. R. WATT 3,111,708
CAPSULE MANUFACTURE
Filed Jan. 4, 1961 3 Sheets-Sheet 2
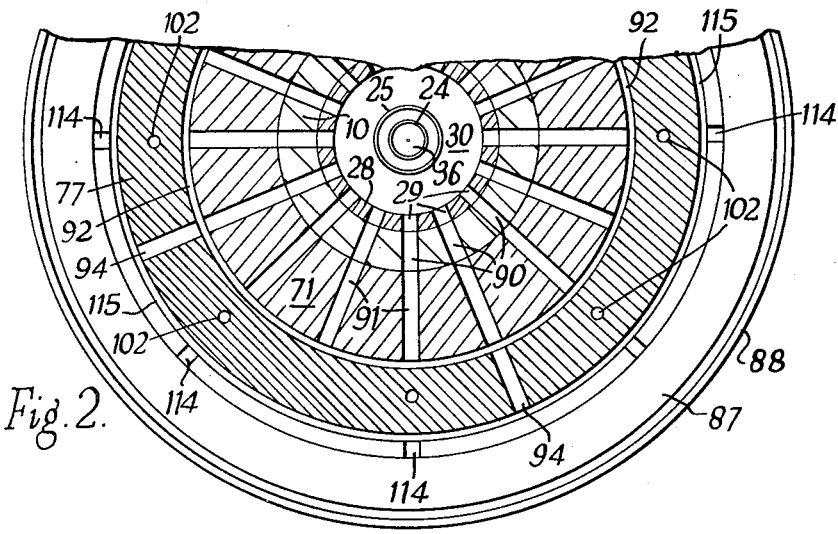
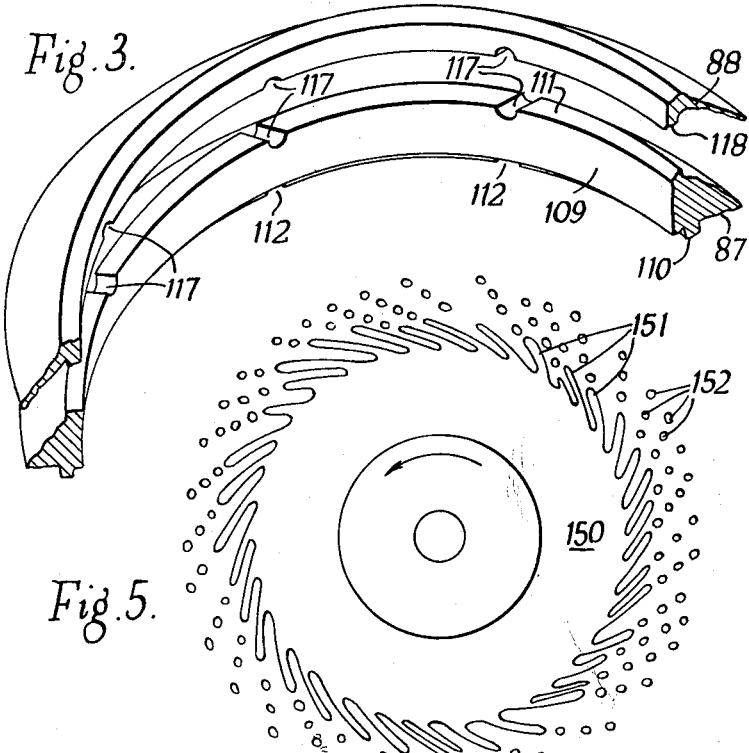
INVENTOR
Peter Ridgway Watt
BY
Albert F. Jacobs
ATTORNEY Nov. 26, 1963 P. R. WATT 3,111,708
CAPSULE MANUFACTURE Filed Jan. 4, 1961 3 Sheets-Sheet 3

INVENTOR
Peter Ridgway Watt
BY
Albert W. Jackie
ATTORNEY

United States Patent Office 3,111,708
Patented Nov. 26, 1963

3,111,708
CAPSULE MANUFACTURE
Peter Ridgway Watt, Reigate, England, assignor to Vitamins Limited, London, England, a British company
Filed Jan. 4, 1961, Ser. No. 80,640
Claims priority, application Great Britain Jan. 5, 1960
10 Claims. (Cl. 18—2.6)

The present invention relates to capsule manufacture and is concerned in particular with seamless capsules. The invention can apply to capsules which have liquid or solid centres.

A known method of manufacturing liquid-containing capsules involves the use of a shell-forming material which is in a liquid state during the encapsulation step and which hardens, dries or otherwise solidifies to produce the capsule shell. This method is conveniently applied to the encapsulation of liquids by arranging for the two liquids, i.e. the filling liquid and the shell-forming material, to be discharged under gravity from the open ends of a pair of concentric tubes at suitable relative rates, so that each liquid forms a series of discrete droplets, each filling liquid droplet being surrounded by an encapsulating or shell-forming liquid droplet. While this method leads to the production of seamless, spherical capsules of a substantially uniform size, it has the disadvantage that a number of factors inherent in the method determine a minimum size of the prepared capsules. The most important of these factors are the viscosities and surface tensions of the liquids, which set a limit to the minimum diameters of the two concentric tubes and to the minimum diameters of the liquid droplets which are discharged therefrom.

A considerable improvement in this known method consists in another method of making seamless capsules, in which liquid filling material and shell-forming liquid are passed respectively through inner and outer tubes and the droplet-forming conditions of the tubes are modified so that discrete liquid droplets of the liquids, each shell-forming liquid droplet surrounding a filling material droplet, are caused to separate from the ends of the tubes before attaining the particle size which they would attain if allowed to separate from the ends of the tubes under the effect of gravity.

The aforesaid method can be carried out in a capsule-making apparatus, comprising inner and outer tubes for delivering droplets of liquid filling material and shell-forming liquid respectively, each shell-forming liquid droplet surrounding a filling material droplet, and means for modifying the droplet-forming conditions of the tubes so that droplets are caused to separate from the ends of the tubes before attaining the particle size which they would attain if allowed to separate from the tubes under the effect of gravity.

The aforesaid method and apparatus can include the use of relative movement between the tubes and a fluid flowing axially and externally thereof in the same sense as the capsule-forming liquids, as by providing an air blast concentrically round the ends of the tubes, by imposing centrifugal force on the tubes or by both measures effected together. For instance, a nozzle formed by the concentric inner and outer tubes may be housed within an air-supply nozzle or a tube supplying another gas or a liquid, such as kerosene. Centrifugal action may be employed by mounting one or more concentric tube nozzles radially upon a shaft, which is rotated while the capsule-forming liquids discharge therefrom.

The capsule-making method and apparatus mentioned above allow uniform seamless capsules to be made of very small sizes. In connection with large-scale work, however, as in the commercial production of large amounts of capsules, this method and apparatus have the relative disadvantage that a correspondingly large number of pairs of tubes or nozzles must be used. This can be inconvenient on an industrial scale, since it is difficult to ensure that the nozzles are continuously maintained in the requisite state of cleanliness during a long run and, in view of the requisite dimensions of the tubes, the throughput for each nozzle, or even for a moderate number of nozzles, say 20, is small.

It is an object of the present invention to provide a method and an apparatus for making capsules which improve upon the aforesaid method and apparatus in relation to quantity production, and, in general, avoid the disadvantages of known capsule-making methods and apparatus, by providing for the manufacture of seamless capsules at considerably increased rates and without the maintenance difficulties of nozzle apparatus.

According to the present invention, a method of making seamless capsules is provided, which comprises discharging liquid filling material from an inner rotating annular orifice, and shell-forming liquid from an outer rotating annular orifice concentric therewith, the filling material thereby assuming the form of an annular disc disposed in co-extensive relation between similar discs of shell-forming liquid, the speed of rotation of the orifices being sufficient to cause peripheral disruption of the co-extensive discs into shell-forming liquid droplets containing filling material droplets.

The present invention also consists in a capsule-making apparatus, which comprises pairs of rotary annular members defining an inner annular orifice and an outer annular orifice concentric therewith for delivering respectively an annular disc of liquid filling material between co-extensive similar discs of shell-forming liquid, the speed of rotation of the pairs of annular members being sufficient to cause peripheral disruption of the co-extensive discs into shell-forming liquid droplets containing filling material droplets.

In accordance with a preferred embodiment of the invention, the co-extensive discs of capsule-forming liquids are formed within a third annular orifice, which may be rotary or stationary, from which a fluid is discharged to effect control of the co-extensive discs and, if desired, otherwise to improve their peripheral disruption and hardening of the resulting droplets. Preferably, the fluid is air and this can be arranged to effect primary dehydration of the shell-forming liquid to promote hardening thereof.

The expression "liquid filling material" is intended to indicate that the filling material is liquid as it is discharged from the corresponding annular orifice, but it should be understood that the filling material may remain liquid, may become solid on formation of the capsules or may even solidify during formation of the composite droplets.

It has been found that rotating annular members arranged as inner and outer pairs and supplied with liquid filling material and shell-forming liquid respectively readily form the aforementioned co-extensive liquid discs. Depending upon the speed of rotation, the composite liquid disc, which can be considered to be a sandwich of a liquid filling material layer between layers of shell-forming liquid, has a critical radius, beyond which the composite disc is unstable and undergoes peripheral disruption. It is found that this disruption commonly takes the form of filaments which break away from the edge of the composite disc in a generally tangential position, each filament comprising shell-forming liquid having a central core of liquid filling material, and these tangential filaments then break up into composite droplets, which are of notably uniform size and shape and harden into the desired seamless capsules.

One important advantage of the present invention is that the use of concentric tubes for delivering liquid droplets is eliminated, along with the disadvantages principally concern the difficulty of adequately cleaning the tubes and their effect is especially pronounced in prior apparatus which includes considerable numbers of pairs of tubes to produce large numbers of capsules. Another important advantage of the invention resides in the considerably greater throughput possible, as compared with nozzle apparatus. A single nozzle comprising a pair of concentric tubes, as used in known apparatus, produces a succession of single capsules at a rate which is dependent upon the input of the capsule-forming liquids, but is limited in view of the dimensions of the tubes and other factors. An apparatus according to the invention in which the annular orifices have a diameter of about 2″ has about a hundred-fold working area as compared with such a single nozzle apparatus.

In order that the invention may be readily understood, reference is made to the accompanying drawings in which:

FIG. 2 shows a section taken on the line II—II of FIG. 1;

FIG. 3 shows a partial perspective view of the rotary annulus-forming members;

FIG. 5 shows a diagrammatic plan view of the composite disc and its mode of disruption.

Figure 1:
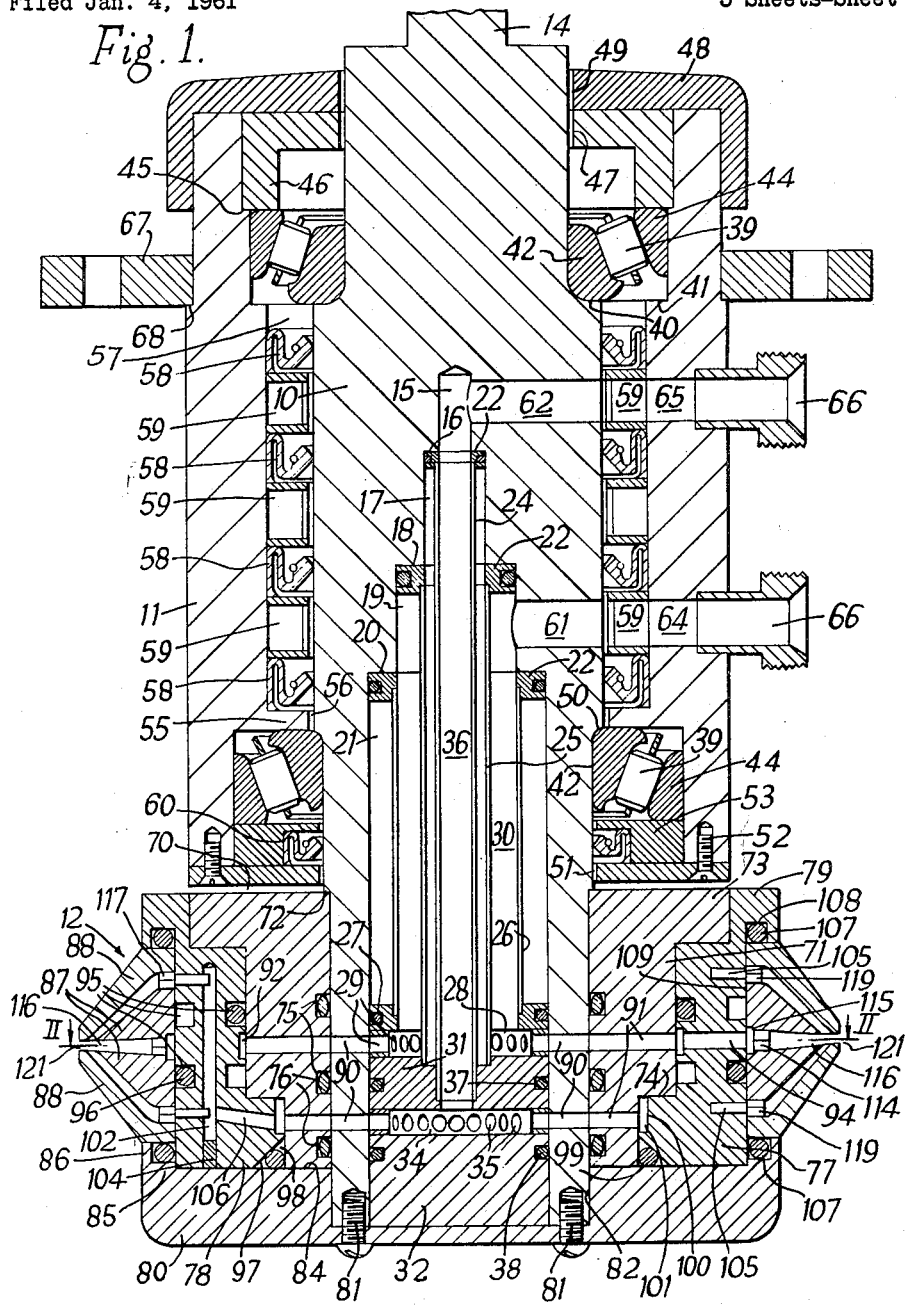
FIG. 1 shows diagrammatically a vertical section of one form of capsule-forming apparatus of the invention.

Referrings to FIGS. 1 to 3, the form of capsule-forming apparatus shown therein comprises a rotary shaft 10 mounted within a stationary tubular housing 11 and carrying a spinner unit, indicated generally at 12. The shaft 10 has a spigot 14 at its upper end, by which the shaft 10 may be connected for rotation thereof to an electric motor (not shown) either directly or indirectly, as by way of a pulley and belt drive. The shaft 10 is bored from its lower end so as to receive a plurality of concentric tubes of successively greater lengths and lesser diameters, for forming concentric passageways for shell-forming material and filling material. As shown in FIG. 1, the shaft 10 includes a boring 15 which is widened at a shoulder 16 into a boring 17, which in turn is widened at a shoulder 18 into a boring 19 and the latter is widened at a shoulder 20 into a boring 21, which extends to the lower extremity of the shaft 10. Sealing rings 22 having the same internal diameter as the superposed boring and the same external diameter as the boring containing them are lodged in the borings 17, 19 and 21 beneath the shoulders 16, 18 and 20. The lower inner edges of the sealing rings 22 are themselves shouldered and receive the upper ends of tubes, a tube 24 being sealingly received in the uppermost ring 22 to extend the passageway formed by the boring 15, a tube 25 being similarly received in the next ring 22 to extend the passageway formed by the boring 17 and a tube 26 being similarly received in the lowermost ring 22 to extend the passageway formed by the boring 19. The tube 26 is similarly sealingly received in a sealing ring 27 at its lower end. This sealing ring 27 is located above a ported ring 28 housed in the boring 21 and having a plurality of radial ports 29, which thereby communicate with the passageway 30 formed between the tubes 26 and 25. The tube 25 extends below the ring 28 and is sealingly received in an aperture in a disc 31 which is located in the boring 21 below the ported ring 28 and has a peripheral seal ring 32. The tube 24 is also sealed in the disc 31 and a second ported ring 34 is located beneath the disc 31, its radial ports 35 thereby communcating with the passageway 36 formed within the tube 24 and the boring 15. The space beneath the ring 34 in the boring 21 is filled by a cylindrical plug 37 having a seal ring 38 lodged in a circumferential groove therein.

The shaft 10 is mounted within the tubular housing 11 by means of upper and lower roller bearings 39. For this purpose, a shoulder 40 is provided on the shaft 10 toward its upper end and at the level of another shoulder 41 formed on the inner surface of the housing 11. The upper roller bearing 39 is housed in the annular space so formed, its inner raceway 42 being supported by the shoulder 40 and its outer raceway 44 contacting the inner wall of the housing 11 above the shoulder 41. A further shoulder 45 is provided on the housing 11 and the lower periphery of an L-section ring 46 rests on the shoulder 45 and bears against the outer raceway 44. The ring 46 surrounds the upper part of the shaft 10 and a clearance 47 is provided therebetween. A cap member 48 is secured to the top of the tubular housing 11 and maintains the ring 46 in position and similarly has a clearance 49 between it and the upper part of the shaft 10. The lower roller bearing 39 is disposed with its inner raceway 42 beneath a shoulder 50 provided on the shaft 10 and its outer raceway 44 abuts the inner surface of the housing 11 and is maintained in position by an annular disc 51, secured by screws 52 to the lower end of the housing 11, and an interposed packing ring 53. The disc 51 has a clearance 54 between it and the shaft 10. The housing 11 includes an integral inwardly-projecting rib 55 which has a clearance 56 between it and the shaft 10. This rib 55 cooperates with the shoulder 50 to maintain the inner raceway 42 of the lower bearing 39 in position and also forms an annular support at the bottom of an annular space 57 between the shaft 10 and the housing 11. The space 57 contains alternately disposed sealing rings 58 and radially-ported rings 59 and a further sealing ring 60 is located between the packing ring 53 and the shaft 10. The dimensions are arranged so that one of the ported rings 59 is disposed at the level of the upper end of the passageway 30 and another ring 59 is disposed at the level of the upper end of the passageway 36. Radial passageways 61 and 62 extend from the respective passageways 30 and 36 in the shaft 10 to the ports in the associated rings 59 and corresponding radial passageways 64 and 65 are provided through the wall of the tubular housing 11. The passageways 64 and 65 are counter-bored from the outside and receive threaded pipe unions 66. In this way, liquid filling material for forming the cores of the capsules may be supplied to the lower union 66 and via the passageway 64, associated ported ring 59, passageway 61 and passageway 30 to the ported ring 28, and shell-forming liquid may be supplied to the upper union 66 and via the passageway 65, the associated ring 59, passageway 62 and passageway 36 to the ported ring 34, so that the liquids are fed through the stationary housing 11 and into the spinner 12 on the lower end of the shaft 10. The capsule-forming apparatus is mounted for this purpose upon a shelf or the like (not shown) by means of a flange 67 secured to the housing 11 above a shoulder 68.

The spinner 12 is mounted on the lower end of the shaft 10 beneath the disc 51 and a clearance 70 is provided between the stationary and rotary parts. The spinner 12 comprises a massive ring 71 fitted upon the shaft 10 beneath a shoulder 72 provided thereon, the ring 71 having a stepped outer profile formed by an annular projection 73 and an undercut portion 74. The inner surface of the ring 70 has three spaced grooves 75 housing sealing rings 76. The ring 71 is surrounded by another ring 77 having the same axial dimension and including an inwardly projecting portion 78 fitting into the undercut portion and an annular projection 79. The rings 71 and 77 are secured in place by a base disc 80 bolted to the lower end of the shaft 10 by bolts 81 and also abutting the plug 37. The base disc 80 includes a central well 82 receiving the shaft 10 and the plug 37, a flat annular surface 84 abutting the lower surfaces of the rings 71 and 77, a shallow peripheral rim 85 surrounding the lower port of the ring 77 and a deeper peripheral rim 86. An opposed pair of inner coned annuli 87 are disposed between an opposed pair of outer coned annuli 88, described in more detail below, and this assembly is located around the ring 77 between the projection 79 and the rim 86 on the base disc 80.

In order to supply the liquid materials to the rotary annular orifices, two series of radial ports 90 are provided through the shaft 10 at the levels of the ported rings 28 and 34 and these mate with two further series of ports 91 provided in the ring 71. The upper series of ports 91 communicating with the ring 28 are disposed in the middle part of the ring 71 and the lower series in its undercut portion 74. At the level of the upper series of ports 91, a shallow rectangular groove 92 is provided around the inner surface of the ring 77 and this communicates with the outer surface by way of four equi-spaced passageways 94, one of which is shown at the right-hand side of FIG. 1. The inner and outer surfaces of the ring 77 include pairs of grooves 95 containing sealing rings 96 above and below the groove 92 and the passageways 94. The inward projection 78 of the ring 77 is chamfered at 97 to provide an annular space 98 which houses a sealing ring 99 between adjacent parts of the rings 71 and 77 and the base disc 80. Above the chamber 97, the inner surface of the ring 77 is recessed at 100 to provide an annular channel 101 communicating with the lower series of ports 91. Eight equi-spaced vertical passageways 102 are drilled upwardly in the ring 77, one of the passageways 102 being shown at the left hand side of FIG. 1, and each pair of passageways 102 is spaced one on either side of one of the passageways 94, as seen best in FIG. 2. These passageways 102 terminate within the ring 77 at their upper ends and their lower ends contain plugs 104. Deep circumferential grooves 105 are provided in the outer surface of the ring 77 above and below the grooves 95 and these grooves 105 communicate with the passageways 102, which are also in communication with the channel 101 by way of inclined passageways 106. The coned annuli 87 and 88 are located between the projection 79 and the rim 86 and sealing rings 107 are provided, respectively in a groove 108 in the underside of the projection 79 and between the rim 86 and the ring 77. The inner annuli 87 (see FIG. 3) comprise ring-shaped members having a cylindrical inner surface 109 fitting around the ring 77 adjacent the sealing rings 96, having an inwardly located rim 110 at the one side and a rim 111 at the other. Semi-circular notches 112 are made in the rims 110 which mate to form passageways 114 (FIG. 1) and the inward location of the rims 110 with respect to the surface 109 forms an annular channel 115 communicating with the passageways 94. In this way, liquid filling material supplied via the lower union 66 as above described is delivered from the passageways 94 to the channel 115 and via the passageways 114 to the annular orifice 116 between the annuli 87. The rims 111 also include semi-circular notches 117 which mate with corresponding notches 117 in a rim 118 provided on each outer coned annulus 88 to form passageways 119 communicating with the grooves 105, whereby shell-forming liquid supplied via the upper union 66 as above described is delivered from the grooves 105 to the passageways 119 and thence via the spaces 120 between the annuli 87 and 88 to the annular orifice 121 between the outer annuli 88.

In operation, the liquid filling material is supplied to the annular orifice 116 via the lower union 66, passageway 64, lower ported ring 59, passageway 61, boring 19, passageway 30, ports 29, upper ports 90, upper ports 91, channel 92, passageways 94, channel 115 and passageways 114 and the shell-forming liquid is supplied from above and below to the annular orifice 121 via the upper union 66, passageway 65, upper ported ring 59, passageway 62, boring 15, passageway 36, ports 35, lower ports 90, lower ports 91, channel 101, inclined passageways 106, upright passageways 102, grooves 105 and upper and lower passageways 119. The rates of supply of the liquid filling material and the shell-forming liquid should be sufficiently high to ensure that the passageways through which they pass remain filled; in other words, the annular orifices 116 and 121 should be flooded. The shaft 10 and the spinner 12 are rotated in the housing 11 by means of the motor or other drive connected to the spigot 14 and a composite disc is discharged from the rotating annular orifices 114 and 121, having the form of a disc of liquid filling material sandwiched between co-extensive discs of shell-forming material.

The apparatus shown in FIGS. 1 to 3 can be modified in order to vary the manufacture of the capsules. For example, cooling or heating fluid can be circulated in the spaces between the passageways 36 and 30 and outside the latter, by way of additional radial passageways extending through the shaft 10 and housing 11 from the borings 17 and 21. The upper part of spinner 12 may include an annular, rotary channel having liquid delivery apertures, the channel being supplied with a shell-hardening liquid such as kerosene, which issues from the apertures as a fine spray falling on to the capsules forming at the edge of the composite disc.

Figure 4:
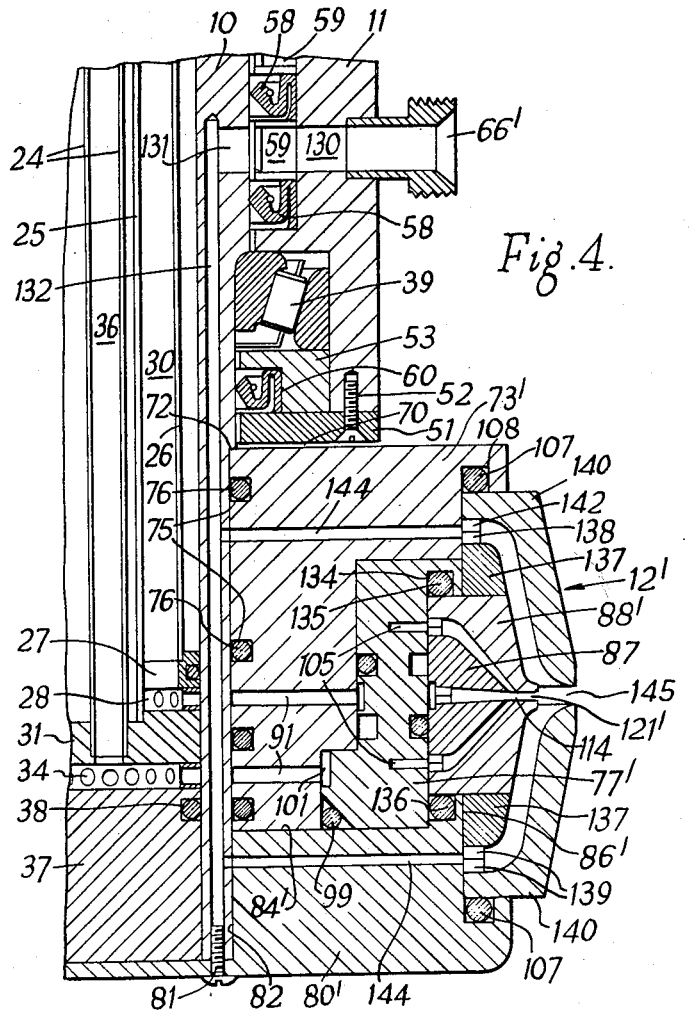
FIG. 4 shows a sectional view similar to FIG. 1 of part of a modified form of capsule-forming apparatus of the invention.

In accordance with a preferred embodiment of the invention, the rotating annular orifices, such as shown at 114 and 121 in FIG. 1, are disposed within a further annular orifice, from which a fluid is discharged on either side of the composite disc. This fluid may be gaseous or liquid and may serve to control formation of the composite disc, effect preliminary hardening by direct action on the shell-forming liquid or by supplying heat for dehydration or for other purposes. This third annular orifice does not need to rotate with the others and can be either rotary or stationary, according to which alternative is more convenient from a constructional point of view. An embodiment of this is illustrated in FIG. 4, which shows part of a capsule-forming apparatus in a section view similar to FIG. 1, but with three unions secured to the stationary housing 11 about the shaft 10. The same or similar parts are given the same references in FIG. 4 as in FIG. 1.

Referring to FIG. 4, a third union 66' is provided in the housing 11 and this leads to a radial passageway 130 communicating with one of the ported rings 59. A corresponding plurality of radial passageways 131 is formed in the shaft 10 and extends partly through the wall surrounding the hollow interior containing the concentric tubes 24, 25 and 26. A plurality of passageways 132 are drilled in the shaft from its lower ends to each of the passageways 131 and the lower ends of the passageways 132 are conveniently sealed by means of the bolts 81 securing the base disc, shown at 80', to the shaft 10. In contrast to the arrangement shown in FIG. 1, the spinner, shown generally at 12', is modified so as to include a third rotary annular orifice. The spinner 12' comprises a massive ring 73' fitted over the shaft 10 and abutting the shoulder 72 formed thereon, the ring 73' being surrounded by a second ring 77'. The latter differs from the ring 77 shown in FIG. 1 in that it surrounds the middle and lower or undercut portions only of the ring 73'. The groove 108 containing the sealing ring 107 is provided in the upper part of the ring 73' and a further groove 134 and sealing ring 135 are provided in the ring 77'. The base disc 80' includes an annular surface 84', supporting the rings 73' and 77', the surface 84' being surrounded by an upstanding rim 86' housing a sealing ring 136. Between the groove 134 and the rim 86', the ring 77' is surrounded by the inner coned annuli 87 and outer coned annuli 88', which have a greater radial dimension than the annuli 88 shown in FIGS. 1 and 3. A further pair of coned annuli 137 are disposed above and below the annuli 88' and respectively adjacent the rim 86' and the projection 138 containing the groove 134. These annuli 137 have rims 138 with spaced semi-circular notches 139 and are surrounded by a further pair of coned annuli 140, including co-operating notches 141 in a rim portion 142. The annuli 140 surround the annuli 137 and 88' and the passageways formed by the notches 139 are connected by radial holes 144 formed respectively in the ring 73' and the base disc 80' to the passageways 132 formed axially of the shaft 10. In this way, compressed air (or other gaseous or liquid material) supplied to the union 66' travels via the passageway 131, ported ring 59, passageways 131, passageways 132, upper and lower radial holes 144 and the mated notches 139 to an annular orifice 145 surrounding the orifices 114 and 121'.

In operation, the shaft 10 is rotated and liquid filling material and shell-forming liquid are fed as previously described to the unions 66 (not shown in FIG. 4). The liquid filling material issues from the annular orifice 114 in the form of an annular disc and the shell-forming liquid issues from the annular orifice 121' on either side of the disc of liquid filling material, so that the latter is disposed between similar and co-extensive annular discs of shell-forming liquid. Air is fed into the union 66' and issues from the orifice 145 as a radial flow on either side of the composite annular disc formed by the liquid filling material sandwiched between the shell-forming liquid. This radial flow of air serves to exert control on the formation and maintenance of the composite annular disc, and particularly if heated air is used, may also effect primary dehydration of the capsule ingredients. The composite droplets undergo hardening of the shell-forming liquid and solidification of the liquid filling material may also occur, depending on its nature, so as to produce capsules either with liquid or solid centres.

The composite annular disc is shown in FIG. 5 at 150 in diagrammatic plan view. The manner in which the disc 150 becomes unstable at the critical radius determined by the speed of rotation, the viscosities of the liquids and other factors is also illustrated. The disc 150 undergoes disruption at its periphery into a plurality of tangential filaments 151, each comprising a core of liquid filling material within shell-forming liquid, and these filaments 151 break down into composite droplets 152 which are of notably uniform size and composition and form the desired capsules on hardening or setting of the shell-forming liquid and, in certain cases, also the filling material. The arrow indicates the direction of rotation of the spinner and also of the composite disc.

The capsule-forming apparatus of the invention can be used to make capsules with any of the shell-forming liquids and liquid filling materials used in conventional capsule-forming apparatus.

The apparatus of the invention is particularly efficient for forming capsules of high potency vitamin-containing oils and also other unstable materials such as flavouring essences and perfumes, which require to be encapsulated in order to prevent their deterioration. The filling material formulations may also include trace additives, such as anti-oxidants or synergists. A typical vitamin-containing oil is molecularly-distilled shark liver oil and the invention can also be used to make other vitamin capsules, for example from crystallisable vitamin A derivatives, such as vitamin A acetate, and from synthetic concentrates, such as high potency vitamin A palmitate. Where the filling material comprises a vitamin, particularly, it is sometimes useful to incorporate a wax or another material which solidifies on cooling, so as to immobilise the contents of the capsule cores.

Typical shell-forming materials include gelatin, plasticised gelatin, polyvinyl alcohol and other synthetic film-forming compounds, methyl cellulose, hydroxyethyl cellulose and polyoxyethylenes. An aqueous solution of methyl cellulose of the requisite viscosity is an excellent shell-forming material. A specific formulation of shell-forming material, for example, is the following:

|  | G. |
|---|---|
| Gelatin (Leiner's Blend 6445) | 540 |
| Sorbitol | 270 |
| Water | 1800 |

This shell-forming liquid may be used at a temperature in the range from 45° to 55° C. It may be further improved by the addition of small amounts, e.g. 10–100 g. in the above formulation, of a polyoxyethylene glycol or other material.

The size ranges of the resultant capsules depend, as will be understood by those skilled in the art, upon a large number of factors, including the physical properties of the liquids, the temperature, the angular velocity and dimensions of the rotating orifices and, in an apparatus such as illustrated by FIG. 4, the pressure of the air or other fluid. The product shows remarkable uniformity of size when classified upon standard screens and a typical size analysis, using B.S. screens, of a batch of capsules is as follows:

|  | Percent |
|---|---|
| Retained on 30-mesh screen | 20 |
| Retained on 40-mesh screen | 60 |
| Retained on 50-mesh screen | 20 |

It will be seen that 60% of the product has a particle size of between 30-mesh and 40-mesh (i.e. screens having 30 and 40 meshes per linear inch or about 140 and 250 meshes per square centimetre, respectively), 20% is of greater particle size and the remaining 20% has a particle size of between 40-mesh and 50-mesh, i.e. retained on a screen having 50 meshes per linear inch (about 390 meshes per square centimetre). In general, it is found that 60–70% of the capsules in a product batch have sufficient size uniformity to be retained on one standard screen size.

The throughput capacity of the apparatus is extremely high, though it is naturally dependent upon many factors and especially the diameter of the annular orifices. An apparatus having an orifice diameter of approximately 2″ (the inner orifice being slightly smaller) and an axial gap for both of 0.015 in. has a throughput of 250 g./m. in. or 15 kg./hr. An apparatus having an orifice diameter of 6″ and axial gap of 0.060 in. has a throughput of about 200 kg./hr., which is many times higher than can be achieved with a nozzle apparatus.

The invention thus provides a method and apparatus for making seamless capsules without employing nozzles and has a high throughput, which renders the method and apparatus eminently suitable for quantity production on a commercial scale.

I claim:

1. A method of making seamless capsules, which comprises discharging liquid filling material from an inner rotating annular orifice and discharging shell-forming liquid from an outer rotating annular orifice concentric with the inner annular orifice, the liquid filling material thereby assuming the form of an annular disc disposed in co-extensive relation between similar discs of shell-forming liquid, rotating the inner and outer orifices at a speed sufficient to cause peripheral disruption of the co-extensive discs into shell-forming liquid droplets containing filling material droplets and recovering the seamless capsules thereby formed by the composite droplets.

2. A method of making seamless capsules, which comprises discharging liquid filling material from an inner rotating annular orifice, discharging shell-forming liquid from an outer rotating annular orifice concentric with the inner annular orifice, the liquid filling material thereby assuming the form of an annular disc disposed in co-extensive relation between similar annular discs of shell-forming liquid, discharging a fluid to effect control of the co-extensive discs from a third annular orifice concentric with and surrounding the inner and outer orifices and within which third annular orifice the co-extensive discs are formed, rotating the inner and outer orifices at a speed sufficient to cause peripheral disruption of the co-extensive discs into composite droplets each comprising a shell-forming liquid droplet containing a filling material droplet and recovering the seamless capsules thereby formed by the composite droplets.

3. A method of making seamless capsules, which comprises discharging liquid filling material from a first annular orifice, discharging shell-forming liquid from a second annular orifice disposed around and concentric with the first annular orifice, discharging air from a third annular orifice disposed around and concentric with the second annular orifice and rotating the annular orifices thereby to cause the liquid filling material to assume the form of an annular disc issuing from the first annular orifice and disposed in co-extensive relation between similar annular discs of shell-forming liquid issuing from the second annular orifice on either side of the liquid filling material disc and effecting control of the co-extensive discs by means of the air issuing from the third annular orifice, the speed of rotation of the orifices being sufficient to cause peripheral disruption of the co-extensive discs into a plurality of tangential filaments which further break down into composite droplets each comprising a shell-forming liquid droplet containing a filling liquid droplet, causing setting of at least the shell-forming liquid of the composite droplets and recovering the seamless capsules thereby formed.

4. The method set forth in claim 3, in which the air is heated air and thereby effects primary dehydration of the composite droplets.

5. A method of making seamless capsules containing a material selected from the group consisting of flavouring essences, perfumes and vitamin-containing materials, which method comprises supplying liquid filling material selected from such group to a first annular zone defined between a first pair of annular members, rotating the first pair of annular members and discharging the liquid filling material from the rotating annular orifice defined by the peripheries of the first pair of annular members as an annular disc, supplying shell-forming liquid material selected from the group consisting of gelatin, aqueous solutions of film-forming compounds, methyl cellulose, hydroxyethyl cellulose and polyoxyethylenes to a second annular zone defined between the first pair of annular members and a second pair of annular members disposed concentrically with and surrounding the first pair of annular members, rotating the second pair of annular members and discharging the shell-forming liquid material from the rotating annular orifice defined by the peripheries of the second pair of annular members as annular discs disposed on either side of and co-extensive with the annular disc of the liquid filling material, supplying heated air to a third annular zone defined between the second pair of annular members and a third pair of annular members disposed concentrically with and surrounding the second pair of annular members and discharging such heated air around the co-extensive discs to effect control thereof and primary dehydration of the ingredients of the liquid filling material and the shell-forming liquid material, the speed of rotation of the annular orifices being sufficient to produce peripheral disruption of the co-extensive discs into tangential filaments which further break down in the heated air into composite droplets each comprising a shell-forming liquid material droplet containing a liquid filling material droplet, effecting hardening of at least the shell-forming liquid material of the composite droplets and recovering the seamless capsules thereby formed.

6. A capsule-making apparatus, comprising, in combination, a first pair of rotary annular members defining an inner annular orifice, a second pair of rotary annular members defining an outer annular orifice which is concentric with and surrounds the inner annular orifice for discharging respectively an annular disc of liquid filling material between co-extensive similar annular discs of shell-forming liquid and means for rotating the first and second pairs of annular members at a speed sufficient to cause peripheral disruption of the co-extensive discs into shell-forming liquid droplets containing filling material droplets.

7. A capsule-making apparatus, comprising, in combination, a first pair of annular members defining therebetween an inner annular orifice for discharging an annular disc of liquid filling material, a second pair of annular members concentric with and surrounding the first pair of annular members and defining therebetween an outer annular orifice for discharging similar annular discs of shell-forming liquid on either side of and co-extensive with the annular disc of liquid filling material, a third pair of annular members concentric with and surrounding the second pair of annular members and defining therebetween a third annular orifice for discharging a fluid to effect control of the co-extensive discs, means for rotating the first and second pairs of annular members at a speed sufficient to cause peripheral disruption of the co-extensive discs into composite droplets each comprising a shell-forming liquid droplet containing a liquid filling material droplet and means for recovering the seamless capsules thereby formed by the composite droplets.

8. A capsule-making apparatus, comrpising, in combination, an upright rotatable shaft, means connecting the shaft to a motor for effecting rotation of the shaft and a spinner unit carried by the shaft, the spinner unit comprising a first pair of rotary annular members defining a first annular orifice, a second pair of rotary annular members defining a second annular orifice surrounding and concentric with the first annular orifice, a third pair of rotary annular members defining a third annular orifice surrounding and concentric with the second annular orifice, means fort supplying liquid filling material to the spinner unit for discharge from the first annular orifice as an annular disc, means for supplying shell-forming liquid to the spinner unit for discharge from the second annular orifice as similar annular discs on either side of and co-extensive with the annular discs of liquid filling material, means for supplying heated air to the spinner unit for discharge from the third annular orifice on either side of the co-extensive discs to effect control of such co-extensive discs and primary dehydration of the ingredients thereof, the motor being adapted to rotate the spinner unit at a speed sufficient to cause peripheral disruption of the co-extensive discs into a plurality of tangential filaments which further break down into composite droplets each comprising a shell-forming liquid droplet containing a liquid filling material droplet, and means for causing setting of at least the shell-forming liquid of the composite droplets for converting such composite droplets into seamless capsules.

9. The capsule-making apparatus set forth in claim 8, which includes a stationary tubular housing containing the shaft, an axial boring in the shaft at the lower end thereof, a plurality of concentric tubes of successively greater lengths and lesser diameters housed in the axial boring thereby to define concentric passageways for supplying liquid filling material, shell-forming liquid and air respectively to the first, second and third pairs of annular members of the spinner unit and a plurality of inlet unions provided on the stationary tubular housing and each communicating in a sealed manner with the respective one of the concentric passageways.

10. The capsule-making apparatus set forth in claim 8, which includes a stationary tubular housing containing the shaft, an axial boring in the shaft at the lower end thereof, a plurality of concentric tubes of successively greater lengths and lesser diameters housed in the axial boring thereby to define concentric passageways for supplying liquid filling material, shell-forming liquid and air respectively to the first, second and third pairs of annular members of the spinner unit, a plurality of inlet unions provided on the stationary tubular housing and each communicating in a sealed manner with the respective one of the concentric passageways, a plurality of interfitting rings comprising the spinner unit and containing series of radial ports communicating with the respective passageways, one series of ports serving to deliver liquid filling material from the respective passageway to the space between the first pair of annular members, a further series of ports serving to deliver shell-forming liquid to the space between the second pair of annular members and another series of ports serving to deliver air to the space between the third pair of annular members.

References Cited in the file of this patent

UNITED STATES PATENTS

| | | |
|---|---|---|
| 2,299,929 | Raynolds | Oct. 27, 1942 |
| 2,333,218 | Von Pazsiczky | Nov. 2, 1943 |
| 2,338,473 | Von Pazsiczky | Jan. 4, 1944 |
| 2,582,561 | Peyches | Jan. 15, 1952 |
| 2,616,124 | Lyle | Nov. 4, 1952 |
| 2,766,478 | Raley | Oct. 16, 1956 |
| 2,799,897 | Jansen | July 23, 1957 |
| 3,015,128 | Sommerville | Jan. 2, 1962 |